(12) United States Patent
Girondi

(10) Patent No.: US 9,011,568 B2
(45) Date of Patent: Apr. 21, 2015

(54) FILTER FOR INTERNAL COMBUSTION ENGINES

(75) Inventor: Giorgio Girondi, Mantova (IT)

(73) Assignee: UFI Innovation Center S.R.L., Ala (Trento) (IT)

( * ) Notice: Subject to any disclaimer, the term of this patent is extended or adjusted under 35 U.S.C. 154(b) by 28 days.

(21) Appl. No.: 13/391,596

(22) PCT Filed: Aug. 4, 2010

(86) PCT No.: PCT/EP2010/061339
§ 371 (c)(1),
(2), (4) Date: May 8, 2012

(87) PCT Pub. No.: WO2011/023503
PCT Pub. Date: Mar. 3, 2011

(65) Prior Publication Data
US 2012/0210687 A1 Aug. 23, 2012

(30) Foreign Application Priority Data
Aug. 27, 2009 (IT) .............................. RE2009A0085

(51) Int. Cl.
*B01D 50/00* (2006.01)
*B01D 24/00* (2006.01)
*B01D 39/06* (2006.01)
*B01D 39/20* (2006.01)
(Continued)

(52) U.S. Cl.
CPC ........ *B01D 46/2407* (2013.01); *B01D 46/0024* (2013.01); *B01D 46/543* (2013.01); *B01D 2267/40* (2013.01); *B01D 2279/60* (2013.01); *F01N 3/0217* (2013.01); *F01N 2330/20* (2013.01); *F01N 2450/30* (2013.01); *F01N 2470/00* (2013.01); *F01N 2470/08* (2013.01); *F01N 2470/14* (2013.01); *F01N 2470/16* (2013.01); *F01N 2470/24* (2013.01); *F02M 35/024* (2013.01); *Y02T 10/20* (2013.01)

(58) Field of Classification Search
CPC ........... B01D 46/2422; B01D 46/2411; B01D 46/2407; B01D 46/002
USPC ............. 55/522–524, 380; 95/273, 279; 422/169–182, 522–524, 380
See application file for complete search history.

(56) References Cited

U.S. PATENT DOCUMENTS 4,102,785 A * 7/1978 Head et al. ................. 210/767
4,904,287 A * 2/1990 Lippert et al. ................. 55/302
(Continued)

FOREIGN PATENT DOCUMENTS

EP     1473522 A1    11/2004

*Primary Examiner* — Amber Orlando
(74) *Attorney, Agent, or Firm* — Volpe and Koenig, P.C.

(57) ABSTRACT

A filter for internal combustion engines, includes a rigid external casing provided with at least an inlet for a fluid to be filtered and an outlet for the fluid when filtered, and a filter cartridge located internally of the external casing, which includes a plurality of tubular filter walls arranged parallel to one another which are destined to be crossed by the fluid flowing from the inlet towards the outlet of the external casing; the external casing being conformed such as to delimit a pouch a transversal section of which, performed along a perpendicular plane to axes of the tubular filter walls, exhibits a prevalent line of development and a small width with respect to the prevalent line of development; the tubular filter walls being arranged internally of the pouch, side by side with one another, forming a single row which follows the prevalent line of development of the pouch.

17 Claims, 10 Drawing Sheets

(51) Int. Cl.
*B01D 39/14* (2006.01)
*B01D 46/00* (2006.01)
*B01D 46/24* (2006.01)
*B01D 46/54* (2006.01)
*F01N 3/021* (2006.01)
*F02M 35/024* (2006.01)

(56) References Cited

U.S. PATENT DOCUMENTS

| | | | | |
|---|---|---|---|---|
| 4,925,463 A | * | 5/1990 | Kuhnert | 95/278 |
| 4,973,458 A | * | 11/1990 | Newby et al. | 423/244.07 |
| 5,182,019 A | * | 1/1993 | Cote et al. | 210/321.8 |
| 5,248,481 A | * | 9/1993 | Bloom et al. | 422/171 |
| 5,248,482 A | * | 9/1993 | Bloom | 422/174 |
| 5,338,326 A | * | 8/1994 | Jelich et al. | 96/402 |
| 5,409,515 A | | 4/1995 | Yamamoto | |
| 5,779,897 A | * | 7/1998 | Kalthod et al. | 210/321.8 |
| 5,795,369 A | * | 8/1998 | Taub | 95/273 |
| 6,716,274 B2 | * | 4/2004 | Gogins et al. | 95/273 |
| 6,740,142 B2 | * | 5/2004 | Buettner et al. | 95/273 |
| 7,004,986 B2 | * | 2/2006 | Kopec et al. | 55/337 |
| 7,429,365 B2 | * | 9/2008 | Taylor | 423/210 |
| 8,105,423 B2 | * | 1/2012 | Alper | 95/285 |
| 2006/0032201 A1 | * | 2/2006 | Kisakibaru | 55/498 |
| 2007/0041881 A1 | * | 2/2007 | Voss et al. | 422/177 |
| 2007/0084162 A1 | | 4/2007 | Seipler et al. | |
| 2007/0104622 A1 | * | 5/2007 | Zuberi et al. | 422/177 |
| 2009/0133382 A1 | * | 5/2009 | Bailey et al. | 60/274 |

* cited by examiner

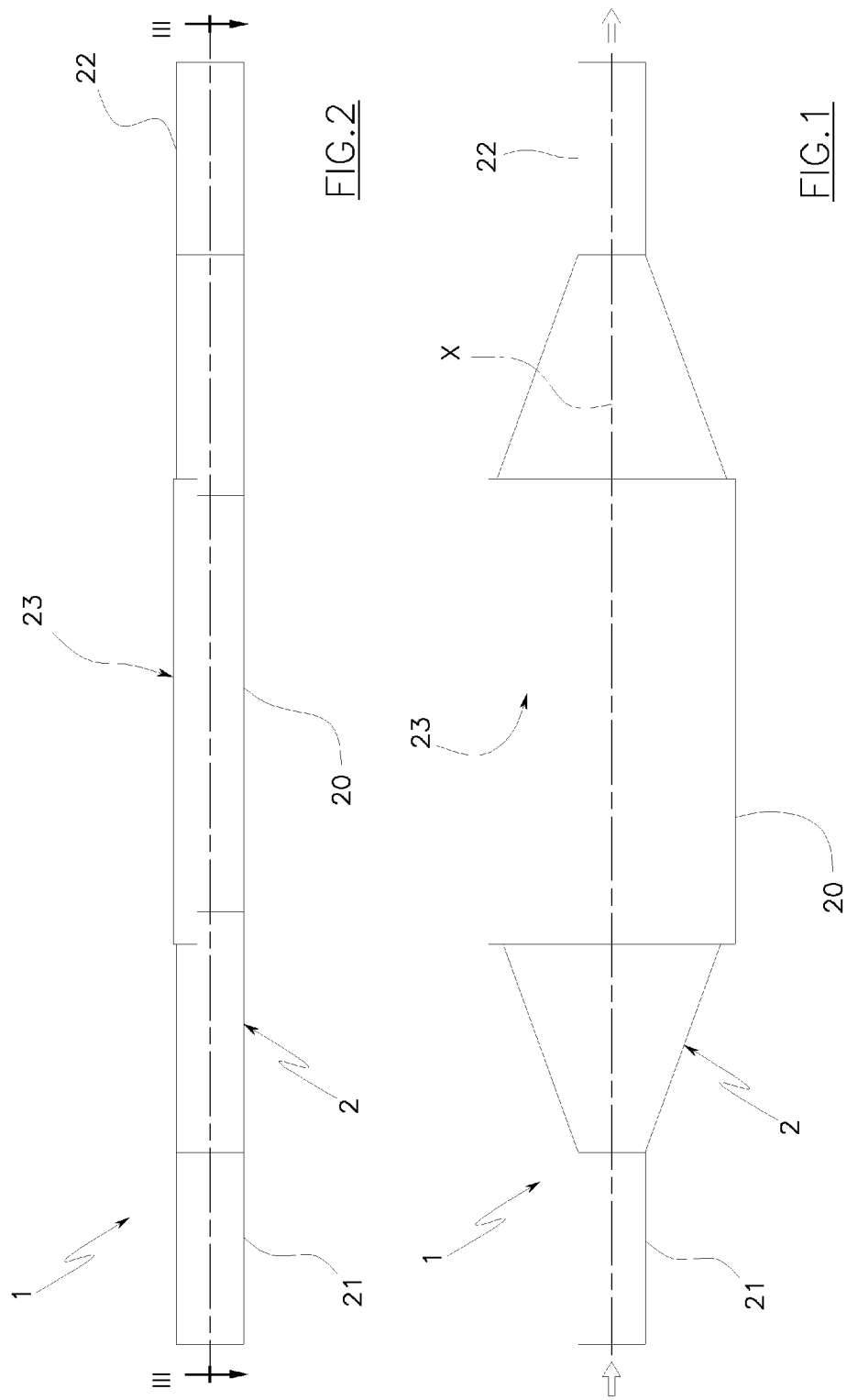

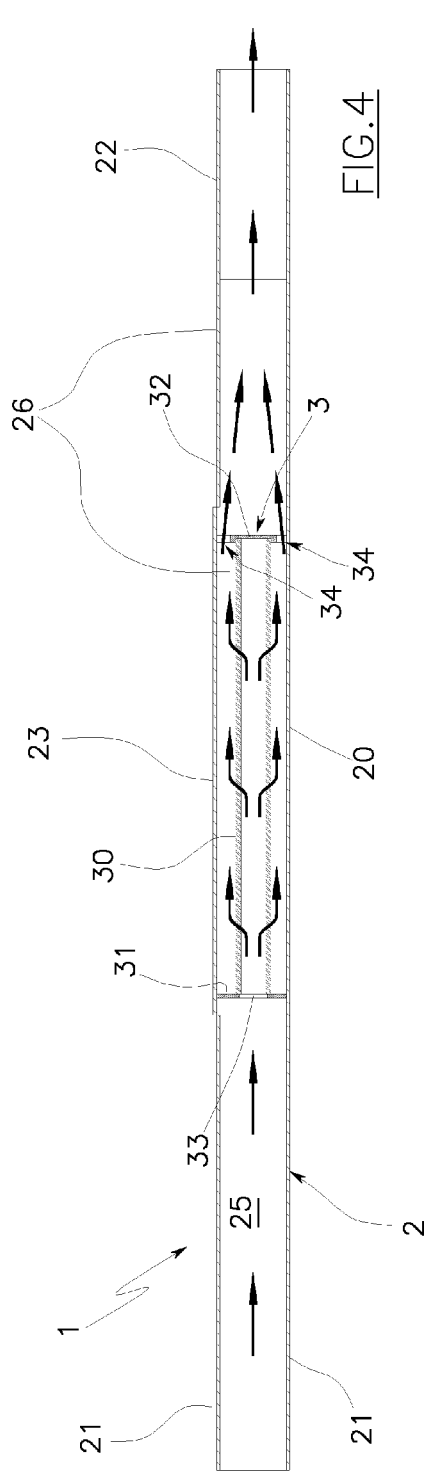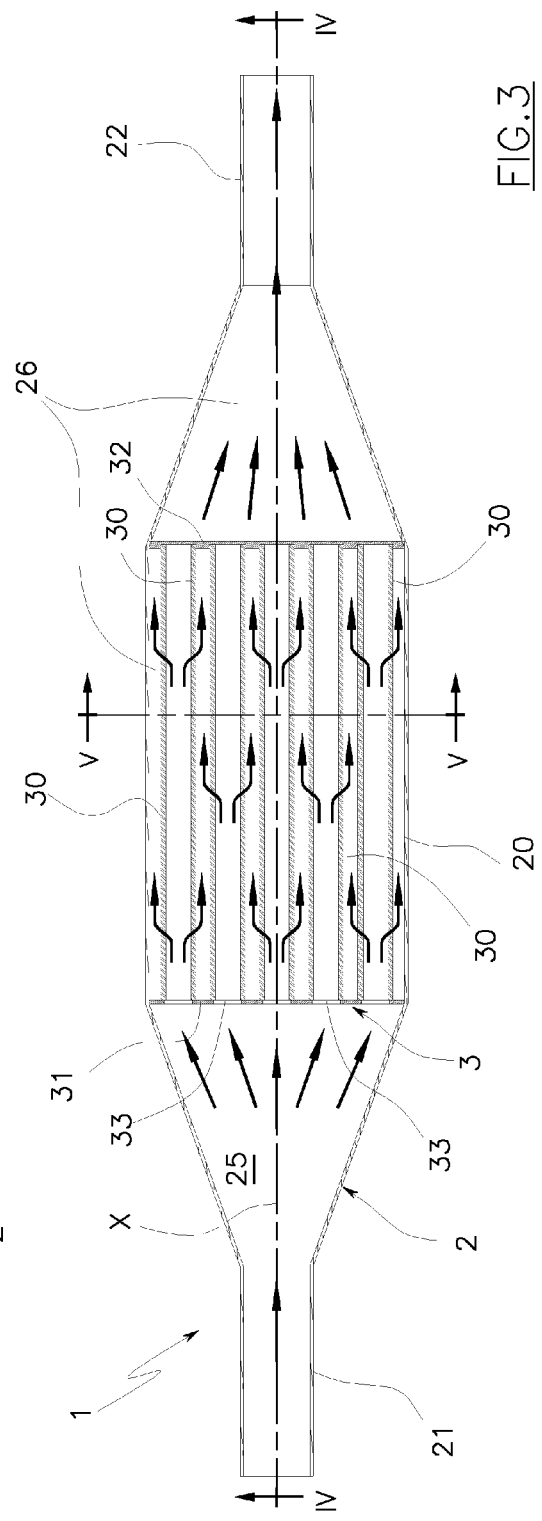

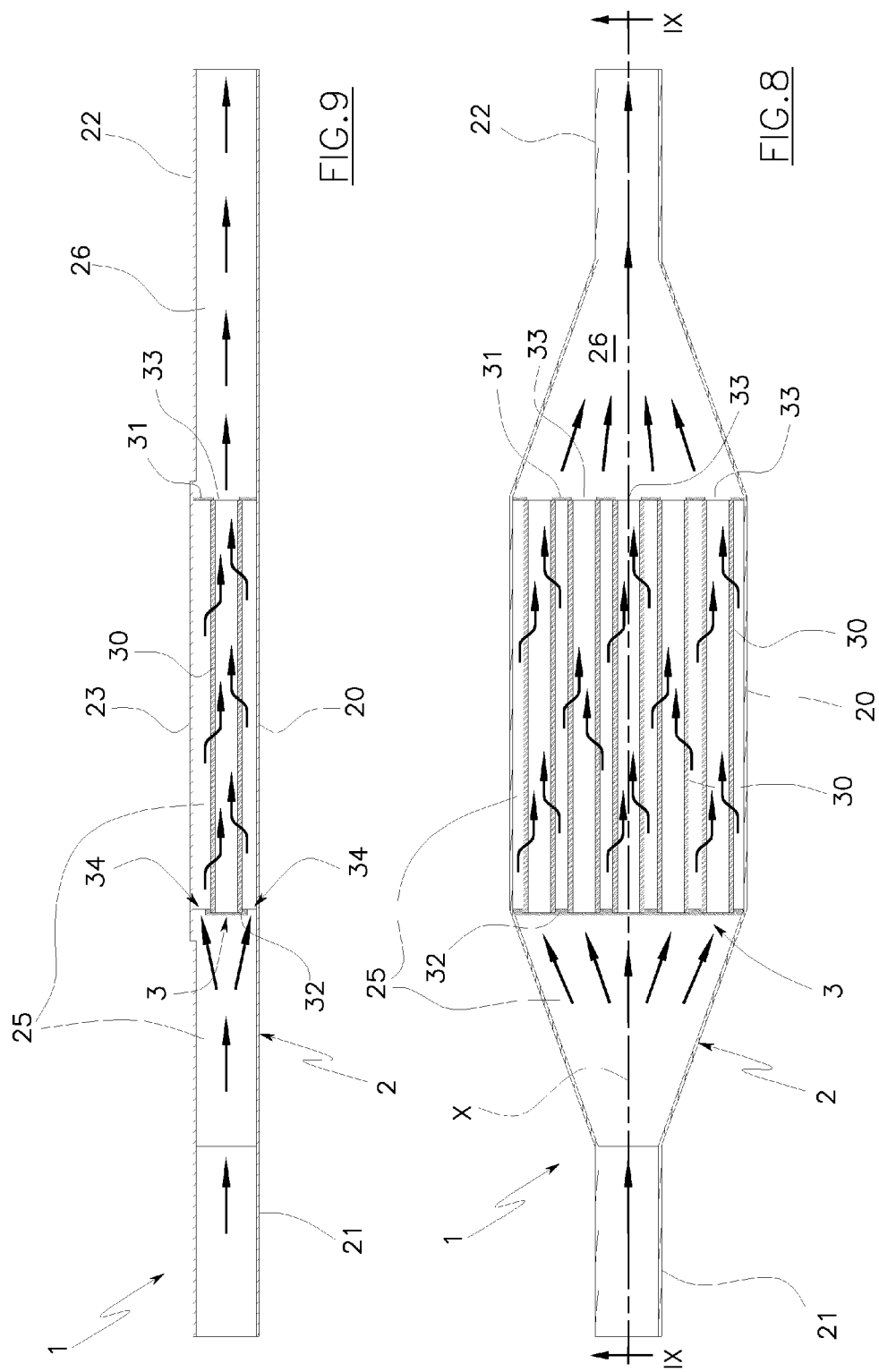

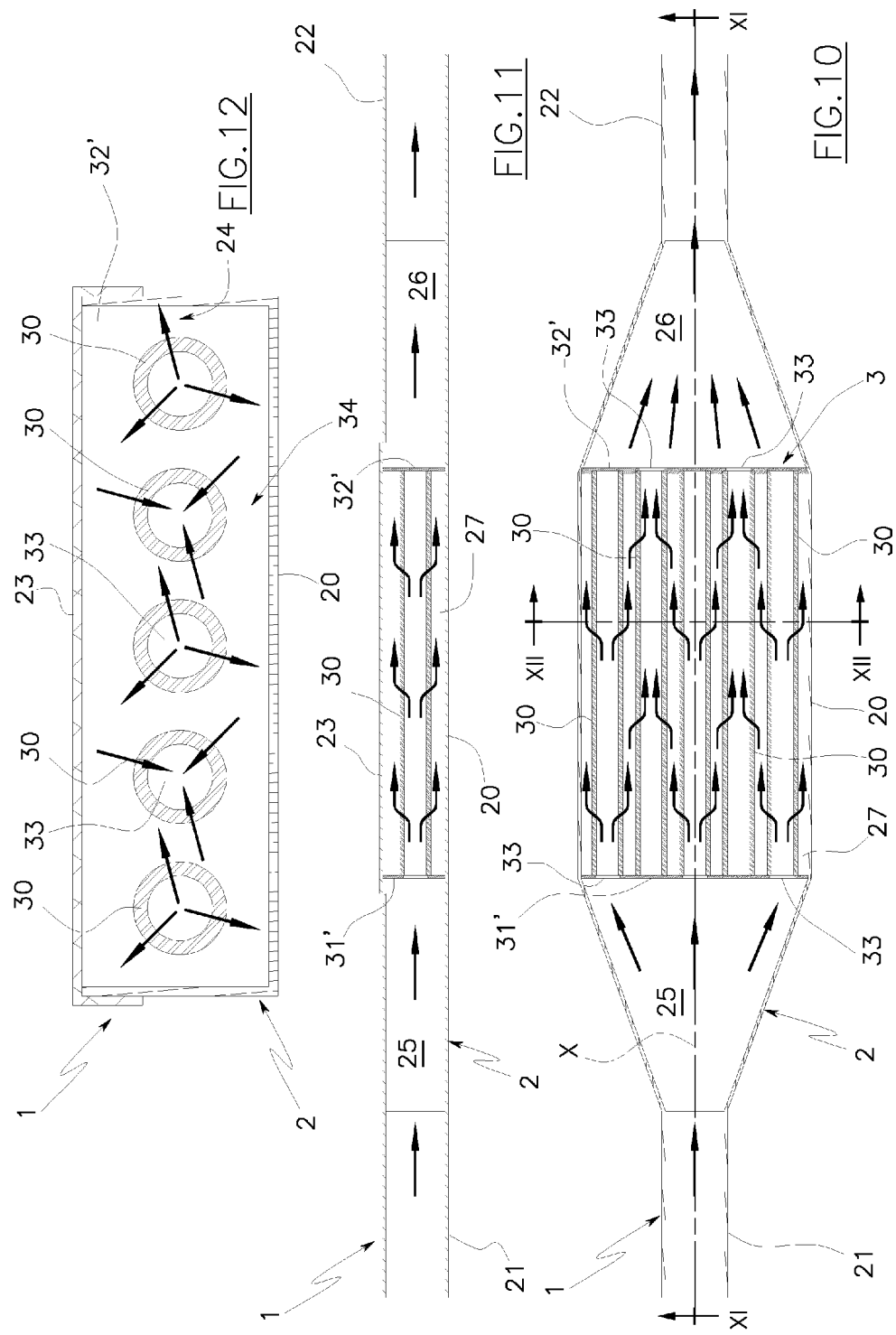

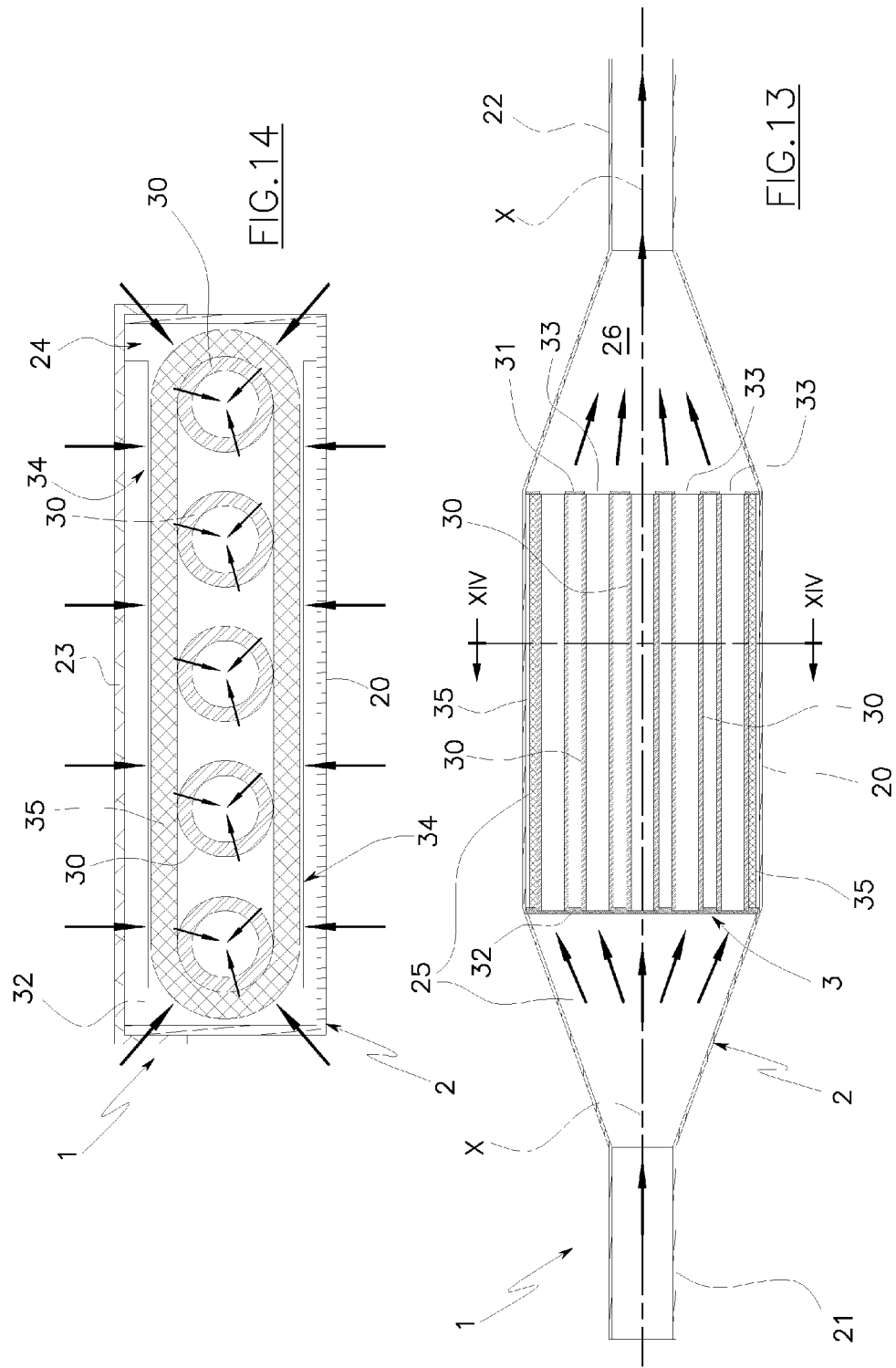

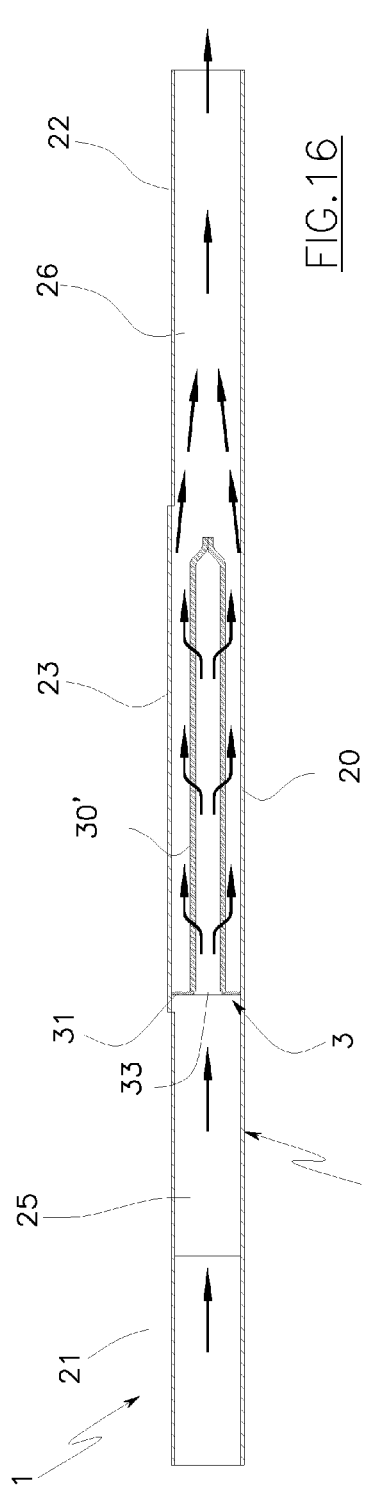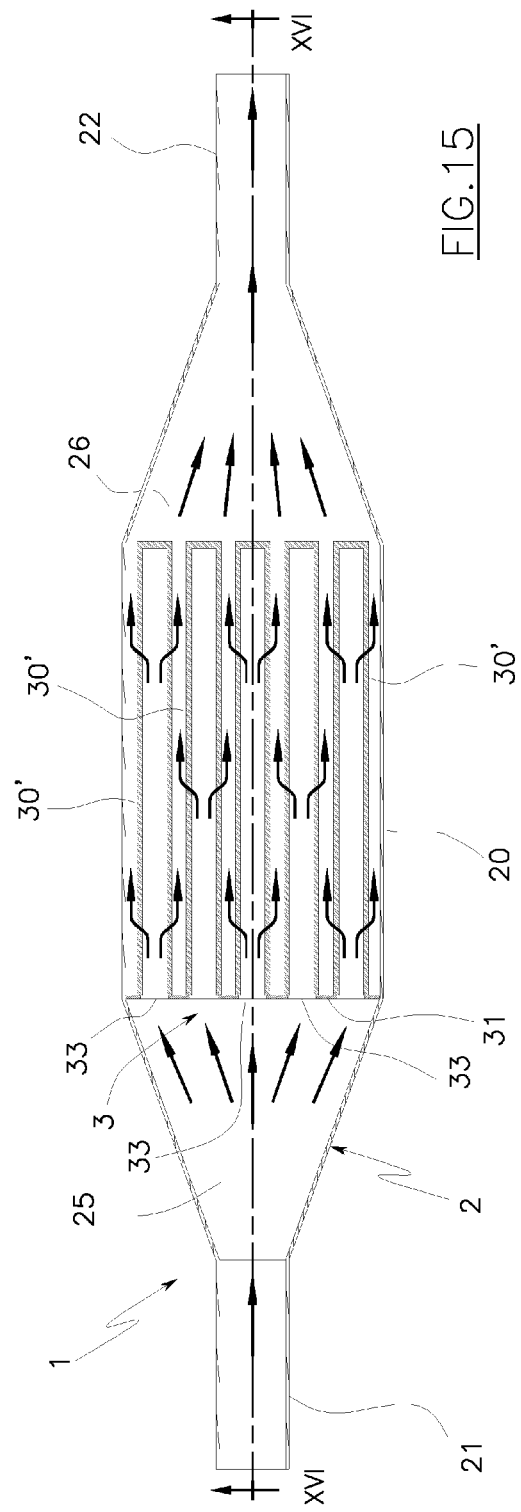

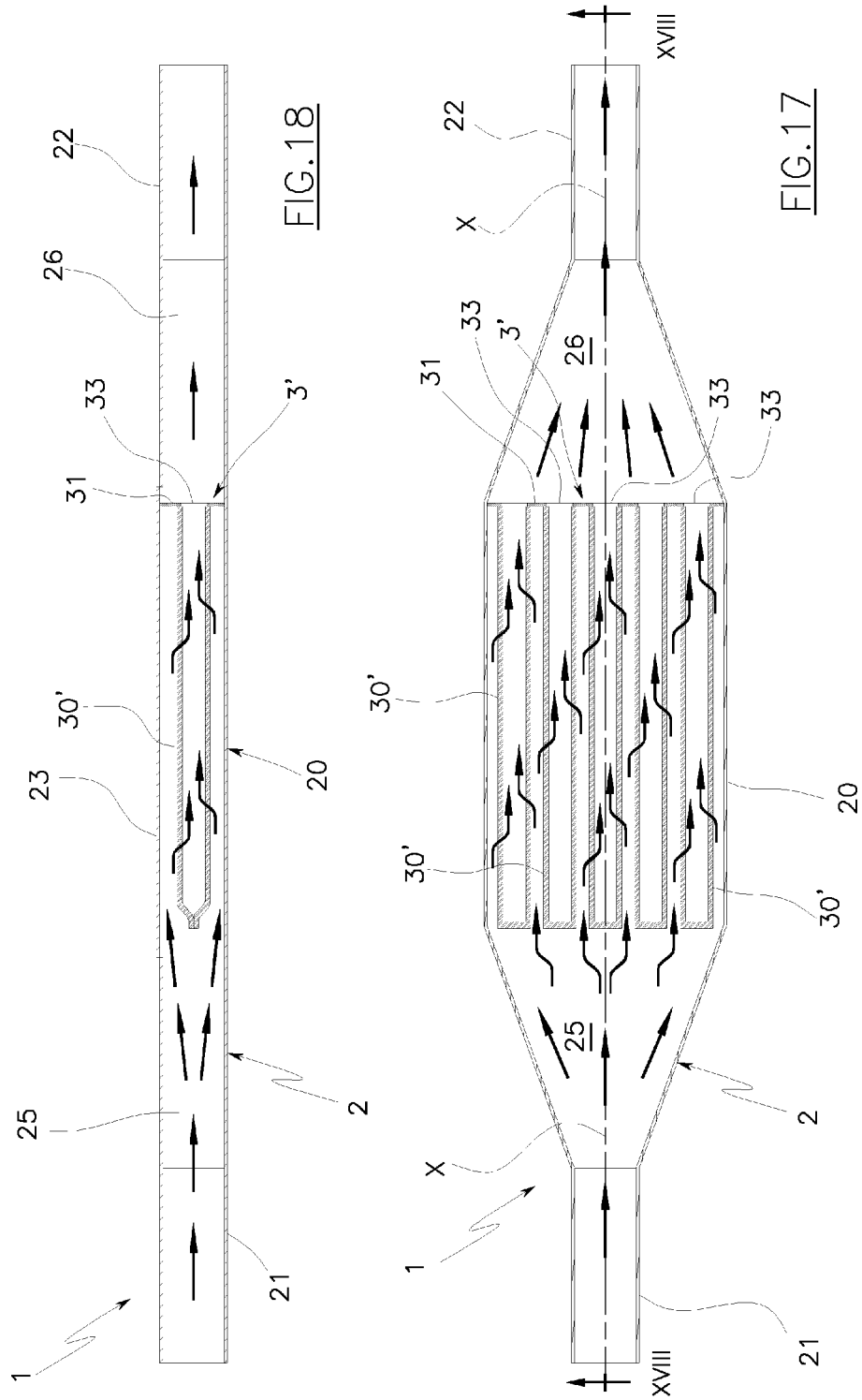

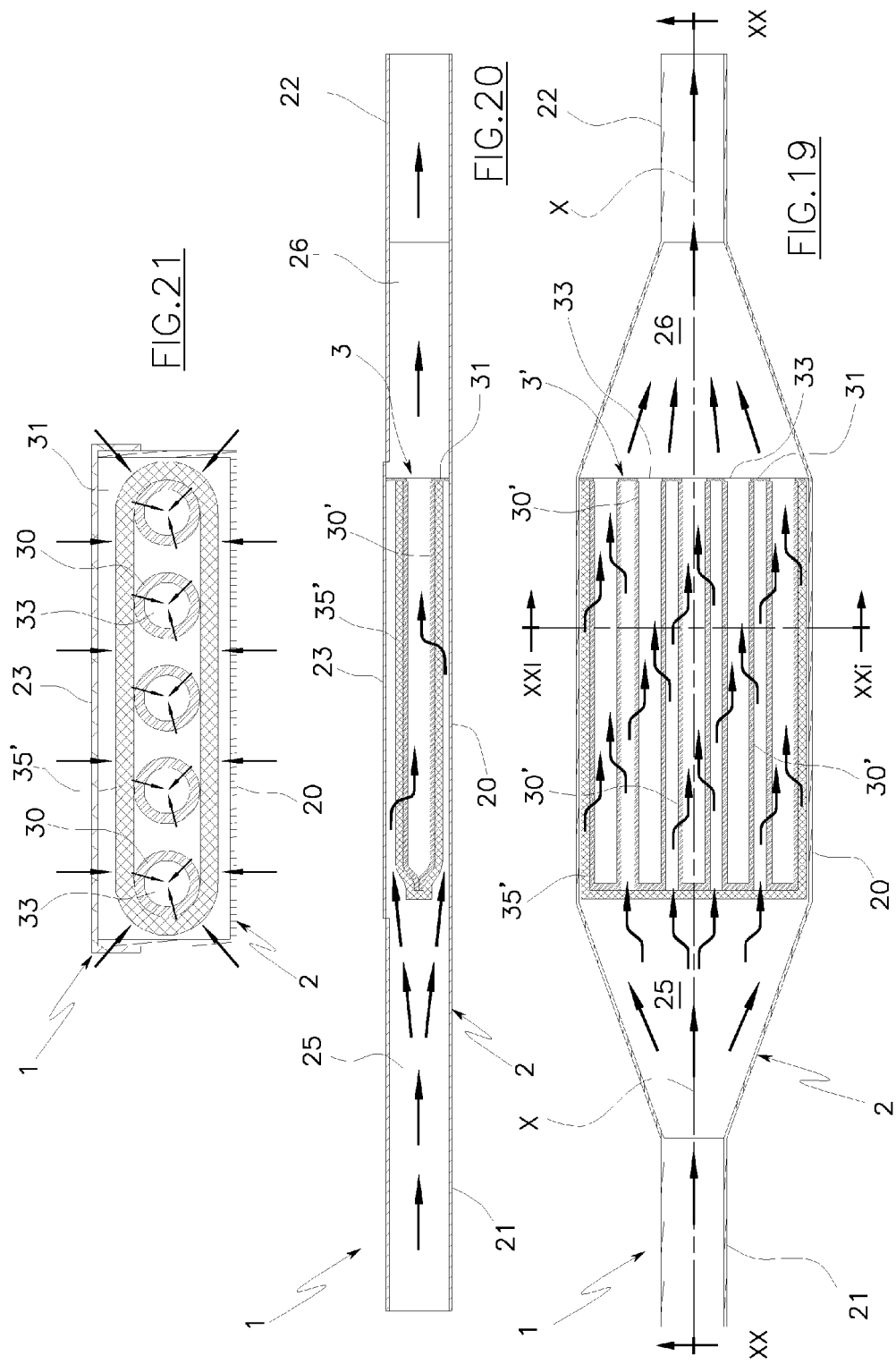

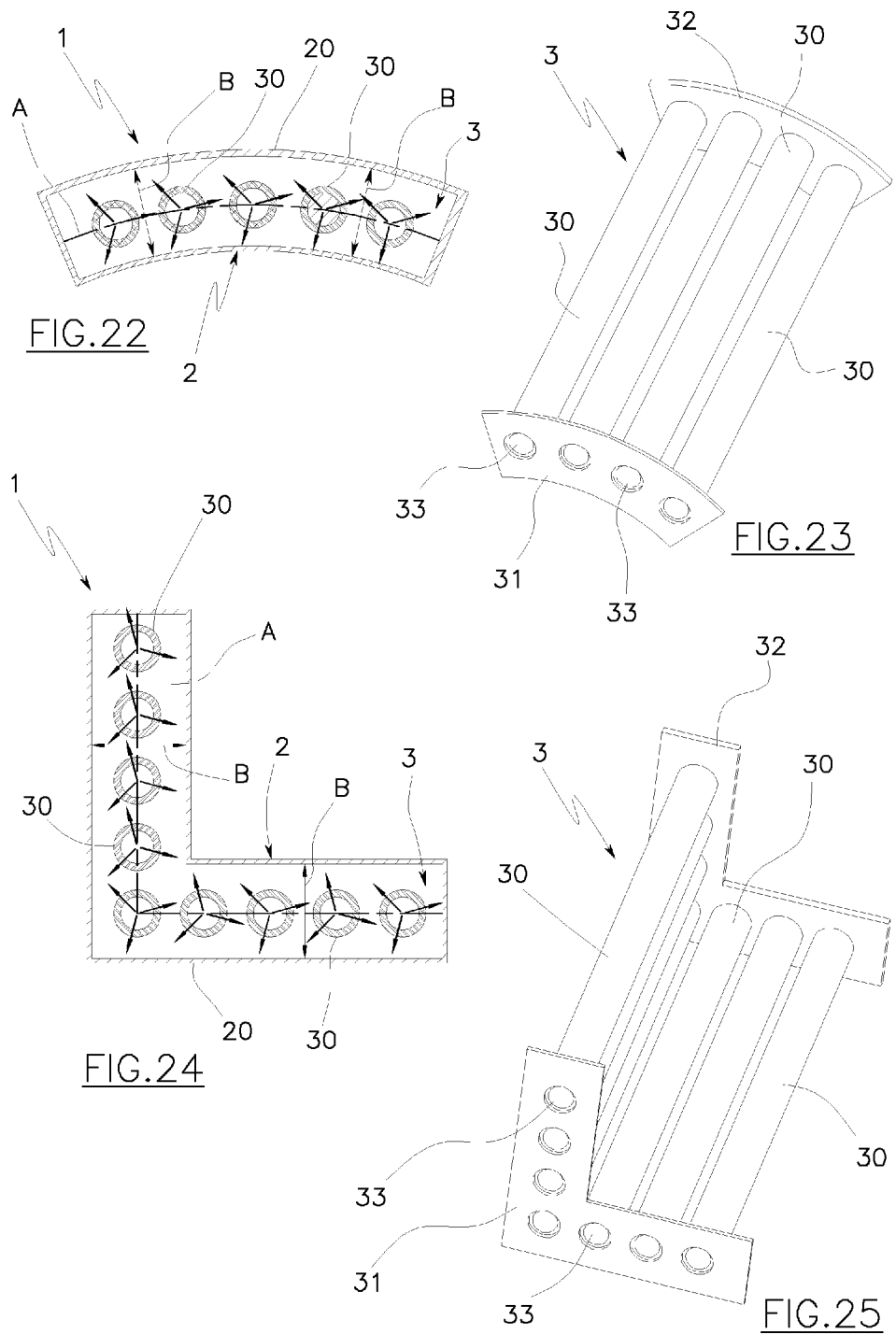

FILTER FOR INTERNAL COMBUSTION ENGINES

TECHNICAL FIELD

The invention relates to a filter for internal combustion engines, especially for internal combustion engines mounted on vehicles.

The characteristics of the invention are mainly applicable to an air filter to be connected to the aspiration of the internal combustion engine, but can also be applied to filters for various fluids, for example a filter for exhaust gas or a filter for combustible.

BACKGROUND ART

As is known, air filters generally comprise a rigid external casing, normally called a filter box, which is provided with an inlet for the air to be filtered and an outlet for the filtered air.

On-board a vehicle, the filter box is normally located internally of the engine compartment, where it is associated to a first conduit destined to connect the air inlet with an air intake afforded in the bonnet or in the front part of the vehicle, and to a second conduit destined to connect the air outlet with the aspiration manifold of the engine.

A filter cartridge is housed in the filter box, destined to filter the air moving from the inlet towards the outlet.

The filter cartridge must have a good filtering efficiency level without causing excessive load loss, and has to have quite a high storage capacity, in order not to have to be replaced too frequently.

The filter cartridge can be of various constructional types, depending on geometric and dimensional characteristics of the filter box.

In particular, the prior art comprises filter cartridges having filter walls conformed as rectangular sheets or toroidal bodies, possibly pleated in order to increase the filtering surface and the storage capacity.

These filter cartridges are rather large and therefore have the drawback of having to be housed internally of unwieldy filter boxes, which take up much space internally of the engine compartment.

Replacement of these filter cartridges further requires large manoeuvring space internally of the engine compartment, which space must be left empty ready for the manoeuvring.

Also known are filter cartridges which comprise a tubular and slightly conical filter wall, which are destined to be directly inserted internally of the aspiration conduit of the engine.

In this case the filter box is constituted by a tract of the aspiration conduit.

These tubular filter walls can be realised by a non-woven textile felt or a more traditional pleated wall.

The tubular filter walls have the drawback of increasing load loss, due to the small space between the wall and the conduit in which it is contained, and of having a storage capacity (and therefore a working life) which is rather limited due to the small filtering surface proffered.

Also known are multi-wall filter cartridges, which comprise a plurality of tubular filter walls which are arranged aligned in parallel rows, such as to form a bundle.

The tubular filter walls are closed at an end by a continuous-wall support flange, while at the other end they are supported by a holed support flange, which is provided with a plurality of through-holes that are singly aligned with the cavity of a respective filter wall.

Multi-wall filter cartridges are housed internally of a filter box, where the tubular filter walls are generally crossed in parallel by the air to be filtered.

On the basis of the embodiment, the air to be filtered can cross the tubular filter walls from the inside towards the outside, or from the outside towards the inside.

Multi-wall filter cartridges have the advantage of guaranteeing rather contained load loss.

A drawback is that multi-wall filter cartridges have the disadvantage of being overall rather voluminous, and thus need large filter boxes which occupy a lot of space internally of the engine compartment.

An aim of the present invention is to resolve the above-mentioned drawbacks in the prior art.

A further aim of the invention is to attain the above objective in the ambit of a simple, rational and relatively inexpensive solution.

DISCLOSURE OF INVENTION

The aims are attained by the characteristics of the invention as reported in independent claim 1. The dependent claims delineate preferred and/or particularly advantageous aspects of the invention.

The invention makes available a filter for internal combustion engines, which briefly comprises a rigid external casing provided with at least an inlet for a fluid to be filtered and an outlet for the filtered fluid, and a filter cartridge located internally of the external casing.

The filter cartridge comprises a plurality of tubular filter walls arranged parallel to one another, which are destined to be crossed by the fluid which flows from the inlet towards the outlet of the external casing.

In the invention, the external casing is conformed such as to delimit a pouch, a transversal section of which, in a perpendicular plane to the axes of the tubular filter walls, exhibits a prevalent line of development and a smaller width with respect to the prevalent line of development.

Internally of the pouch, the tubular filter walls are arranged side-by-side forming a single row which follows the prevalent line of development of the pouch.

In practice, a single tubular filter wall is contained in the width of the pouch.

It follows that the thickness selected can be quite small, obtaining a slim external casing which more efficiently and rationally occupies the spaces available within the engine compartment of a vehicle.

The prevalent line of development of the pouch can be of any shape, for example it can be a straight line, a curved line or a split line.

If the prevalent line is straight, the external casing of the filter is a flat and slim body, which can advantageously be housed in an approximately parallelepiped space of small height.

If the prevalent line of development is curved, the external casing of the filter is a slim and convex body, which can advantageously be housed in curved spaces of the engine compartment, for example below an aesthetically-attractive cover.

If the development line is split, the external casing of the filter is an angular body, which can advantageously be housed in the corners of the engine compartment.

In the invention, the tubular filter walls generally have to be of a small diameter and a considerable length.

The small diameter enables the thickness of the external casing to be proportionally reduced.

The small diameter further means that the filter walls have slim lateral walls, thus leading to a reduction in load loss.

The considerable length means that an overall rather large filter surface can be realised, notwithstanding the contained diameter of the filter walls.

The good length further facilitates distribution of the fluid internally of the tubular filter walls, with consequent fluid-dynamic advantages.

In this context, in a preferred aspect of the invention the diameter of each tubular filter wall does not exceed 20% of its length.

For structural reasons, it is further preferable that the diameter of the tubular filter walls does not fall below 2% of its length.

The tubular filter walls can be made of a non-woven textile made of polymer fibres, for example polypropylene, which can be obtained through any known process, preferably melt-blown.

In the invention, the tubular filter walls can be realised such as to exhibit both ends open.

In this case, a first end of each tubular filter wall is preferably fixed to a support flange, which is provided with at least a through-hole aligned with the internal cavity of the tubular filter wall; while the opposite end of each tubular filter wall is closed by a second support flange having a continuous wall.

A preferred embodiment of the invention however has each tubular filter wall realised such as to exhibit an open end and an opposite closed end, such as substantially to take on the shape of an elongate hood.

The closure can be obtained by flattening and joining the lateral wall of the tubular filter wall, at the end thereof.

In this case too, the open end of each tubular filter wall is preferably fixed to a support flange having at least a through-hole which is aligned with the internal cavity of the tubular filter wall; but the opposite closed end can be left free.

According to the invention, the filter cartridge can be predisposed such that the tubular filter walls are crossed in parallel by the fluid flowing from the inlet towards the outlet of the external casing.

In this way, notwithstanding the small size of each single tubular filter wall, the overall filter surface of the filter cartridge is quite large, such as to guarantee and adequate overall storage capacity.

In this context, the filter cartridge can be predisposed so that the fluid crosses each tubular filter wall from the inside towards the outside, or alternatively from the outside towards the inside.

According to the invention, the filter cartridge can comprise a further tubular wall, for pre-filtration, which externally surrounds and contains all the tubular filter walls, such as to be crossed first by the fluid flowing from the inlet towards the outlet.

In practice, the pre-filtering tubular wall is crossed in series with respect to the tubular filter walls, and it is arranged upstream thereof with respect to the fluid direction, in order to retain the larger particles which otherwise might rapidly block up the tubular filter walls.

The pre-filtering tubular wall can be made of a non-woven textile made of polymer fibres, for example polypropylene or polyester, which can be obtained through any known process.

The pre-filtering tubular wall is generally more porous than the tubular filter walls.

The pre-filtering tubular wall is preferably made such as to exhibit a closed end, such as to take on a bag-shape or a beaker-shape which houses the tubular filter walls internally thereof.

The closure can be obtained by means of flattening and joining the lateral wall of the pre-filtering tubular wall at the end thereof.

Alternatively, the filter cartridge can be predisposed such that at least one of the tubular filter walls is destined to be crossed in series with respect to the others.

The tubular filter wall can be arranged upstream of the others with respect to the direction of the fluid, in order to perform the pre-filtering stage.

The tubular filter wall can be of the same size as the others, but will generally be more porous.

BRIEF DESCRIPTION OF DRAWINGS

Further characteristics and advantages of the invention will emerge from a reading of the following description, which is provided by way of non-limiting example with the aid of the figures of the drawings, in which:

FIG. 1 is a plan view of an air filter of the invention;

FIG. 2 is a perpendicular projection of the view of FIG. 1;

FIG. 3 is section III-III of FIG. 2;

FIG. 4 is section IV-IV of FIG. 3;

FIG. 8 is the section of FIG. 3 relating to an air filter of a first embodiment of the invention;

FIG. 9 is section IX-IX of FIG. 8;

FIG. 10 is the section of FIG. 3, relating to an air filter of a second embodiment of the invention;

FIG. 11 is section XI-XI of FIG. 10;

FIG. 12 is section XII-XII of FIG. 10, rotated and shown in enlarged scale;

FIG. 13 is the section of FIG. 3 relating to an air filter of a third embodiment of the invention;

FIG. 14 is section XIV-XIV of FIG. 13, rotated and shown in enlarged scale;

FIG. 15 is the section of FIG. 3 relating to an air filter of a fourth embodiment of the invention;

FIG. 16 is section XVI-XVI of FIG. 15;

FIG. 17 is the section of FIG. 3 relating to an air filter of a fifth embodiment of the invention;

FIG. 18 is section XVIII-XVIII of FIG. 17;

FIG. 19 is the section of FIG. 3 relating to an air filter of a sixth embodiment of the invention;

FIG. 20 is section XX-XX of FIG. 19;

FIG. 21 is section XXI-XXI of FIG. 19, rotated and shown in enlarged scale;

FIG. 22 is the section of FIG. 5 relating to an air filter of a seventh embodiment of the invention;

FIG. 23 is a perspective view of the filter cartridge mounted in the air filter of FIG. 22;

FIG. 24 is the section of FIG. 5 relating to an air filter of an eighth embodiment of the invention;

FIG. 25 is a perspective view of the filter cartridge mounted in the air filter of FIG. 24.

BEST MODE FOR CARRYING OUT THE INVENTION

Figure 5:
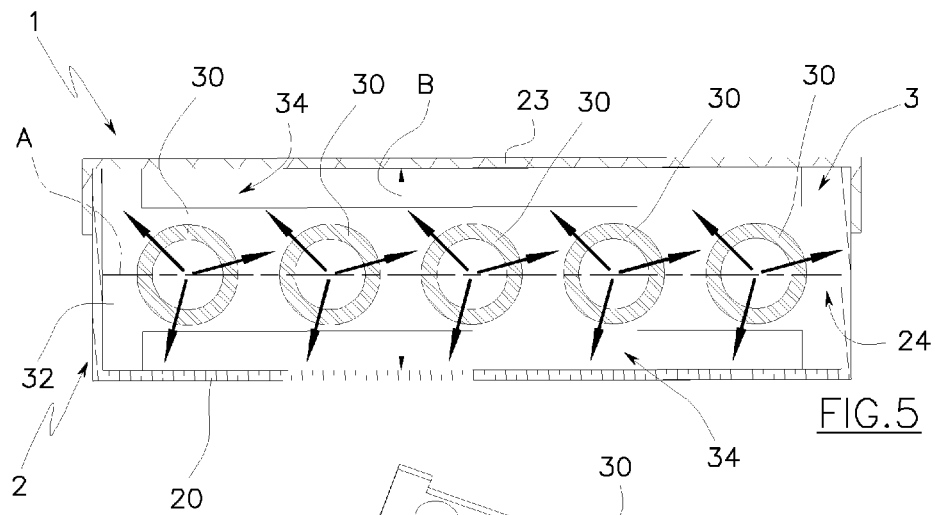
FIG. 5 is section V-V of FIG. 3, rotated and shown in enlarged scale.

The air filter 1 illustrated in FIGS. 1 and 2 comprises a rigid external casing 2 which in the following will be simple called the filter box.

The filter box 2 can be made of fashioned sheet metal or of plastic.

The filter box 2 comprises a central body 20 which communicates with an inlet 21 for the air to be filtered and with an outlet 22 for the filtered air.

The inlet 21 and the outlet 22 are aligned along a longitudinal axis X of the filter box 2.

The central body 20 comprises an openable cover 23, for insertion or extraction of a removable filter cartridge 3 (see for example FIG. 7), which is destined to be inside the filter box 2 in order to filter the air flowing from the inlet 21 to the outlet 22.

The filter cartridge 3 comprises a plurality of tubular filter walls 30 arranged parallel to one another and destined to be crossed by the air to be filtered, in order to retain the impurities that may be present in the air.

The filter cartridge 3 is inserted internally of the central body 20 of the filter box 2, such that the tubular filter walls 30 are parallel to the longitudinal axis X.

The tubular filter walls 30 can be made of a non-woven textile made of polymer fibres, for example polypropylene, which can be obtained through any known process, preferably through a melt-blown process.

The tubular filter walls 30 are generally rather rigid, and are therefore destined normally to maintain the tubular shape and straight development thereof.

In the illustrated examples, the tubular filter walls 30 all have the same dimensions.

The tubular filter walls 30 have diameters that are generally contained and are considerably long.

The contained diameter enables a reduction in the size of the filter box 2 and further means that the tubular filter walls 30 have a wall thickness which is consequently rather small, thus reducing the load losses.

The considerable length enables an adequately long filter surface to be realised, notwithstanding the limited diameter of the tubular filter walls 30, and further facilitates distribution of the air internally thereof, with consequent fluid-dynamic advantages.

In particular, the diameter of the tubular filter walls 30 is preferably not greater than 20% of the length thereof.

For structural reasons, it is preferable that the diameter of the tubular filter walls 30 should not fall below 2% of the length thereof.

However each tubular filter wall 30 could be coupled to a respective support, consisting for example of a holed plastic or metal tube which is coaxially inserted internally or externally of the relative tubular filter wall 30.

The filter box 2 is destined to be housed internally of the engine compartment of a vehicle (not illustrated), with the inlet 21 connected to an air intake which can be fashioned on the bonnet or in the front part of the engine compartment, and the outlet 22 connected with the aspiration manifold of the internal combustion engine of the vehicle.

As illustrated in FIG. 5, the central body 20 of the filter box 2 is conformed such as to provide a pouch 24 a transversal section of which, made along a perpendicular plane to the axis of the tubular filter walls 30, exhibits a prevalent development along a predetermined development line denoted by A, and a small width B with respect to the prevalent development.

The width B is taken as the dimension of the pouch 24 going in a perpendicular direction to the prevalent line of development A, considered at each point thereof.

The width B is preferably constant along the prevalent line of development A. The tubular filter walls 30 of the cartridge 3 are inserted in the filter box 2 side-by-side with one another, such that the width B of the pouch 24 is occupied by a single tubular filter wall 30.

In practice, the tubular filter walls 30 of the cartridge 3 are arranged aligned in order to form a single row which follows the prevalent line of development A of the pouch 24.

Figure 6:
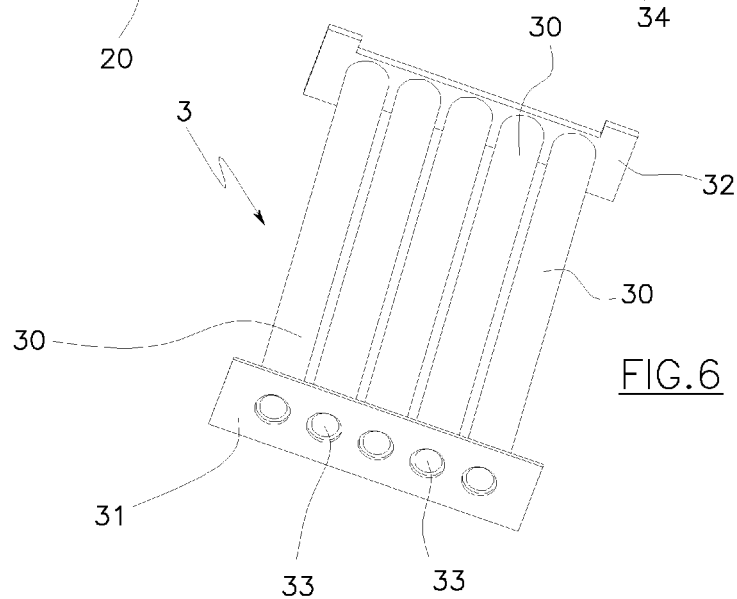
FIG. 6 is a perspective view of the filter cartridge mounted in the air filter of FIG. 1.

In the embodiment of FIG. 5, the prevalent line of development A is a straight line, and consequently the filter cartridge 3 comprises a plurality of tubular filter walls 30 having parallel axes which lie on a single plane (see also FIG. 6).

In this way, the filter box 2 is a flat and slim body, which can be housed in an approximately parallelepiped space and a small height.

Figure 7:
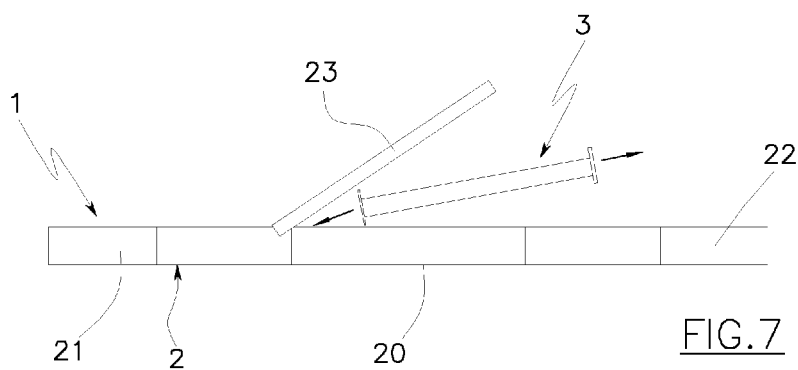
FIG. 7 is FIG. 2, illustrated during insertion/extraction of the filter cartridge.

The filter box 2 further requires little manoeuvring space internally of the engine compartment in order to replace the filter cartridge 3, as the cartridge 3 can be extracted and inserted with an oblique movement as shown in FIG. 7.

In the alternative embodiment illustrated FIGS. 22 and 23, the prevalent line of development A of the pouch 24 is a curved line, and consequently the filter cartridge 3 comprises a plurality of tubular filter walls 30 having parallel axes which lie on a single curved surface.

In this way the filter box 2 is a slim and convex body which can be housed in proximity of curved walls of the engine compartment, for example below an aesthetically-attractive cover.

In the alternative embodiment illustrated in FIGS. 24 and 25, the prevalent line of development A of the pouch 24 is a split line, and consequently the filter cartridge 3 comprises a plurality of tubular filter walls 30 having parallel axes which lie on two incident planes.

In this way, the filter box 2 is a slim angular body which can be housed inside a corner of the engine compartment.

From a structural and functional point of view, the air filters illustrated in FIGS. 22 and 24 are entirely similar to the air filter illustrated in FIG. 5.

For this reason, the further characteristics, variants and advantages of the invention will be described in the following with reference to a flat air filter, by this meaning that the characteristics, variants and advantages can also be applied to the embodiments of FIGS. 22 and 24.

In the example illustrated in figures from 1 to 5, the filter walls 30 are made such as each to exhibit open ends.

The ends of the tubular filter walls 30 are fixed to a respective support flange 31 and 32.

The support flanges 31 and 32 are singly destined to connect the tubular filter walls 30 to one another in order to make the filter wall 3 a single body.

The tubular filter walls 30 can be fixed to each support flange 31 and 32 by gluing, by means of a jointing or by any other appropriate system.

The support flanges 31 and 32 can be made of a plastic or a metal material.

The support flange 31 comprises a plurality of through-holes 33 in a same number as the tubular filter walls 30, each of which is aligned with the cavity of a respective tubular filter wall 30.

The support flange 32 has a continuous wall in order to close the opposite end of each tubular filter wall 30.

The filter wall 3 is located internally of the filter box 2 with the support flange 31 facing towards the inlet 21 and the support flange 32 facing towards the outlet 22.

As illustrated in FIGS. 3 and 4, the support flange 31 entirely occupies the transversal section of the filter box 2, such as to sub-divide the internal volume into two distinct chambers, of which a first chamber 25 communicates with the inlet 21 and a second chamber 26 communicates with the outlet 22.

The support flange 32 exhibits little chambers (see FIGS. 4, 5 and 6) which define, internally of the filter box 2, lateral passages 34 that are external of the cavities of the tubular filter walls 30.

Thanks to this solution, the air to be filtered which enters the first chamber 25 is forced to pass through the through-holes 33 of the support flange 31 and to flow axially along the tubular filter walls 30.

As the opposite end of the tubular filter walls 30 is closed by the support flange 32, the filter air is forced to cross the tubular filter walls 30 radially from the inside towards the outside, in order to reach the second chamber 26.

The filtered air in the second chamber 26 flows freely through the lateral passages 34 defined by the support flange 32 towards the outlet 22.

The tubular filter walls 30 are then crossed in parallel by the air to be filtered, such that notwithstanding the smaller dimensions of each single tubular filter wall 30 the overall filter surface of the filter cartridge 3 is quite large in order to guarantee an adequate overall storage capacity.

FIGS. 8 and 9 show a variant of the air filter 1 which differs from the preceding one due to the fact that the filter cartridge 3 is mounted substantially oppositely, i.e. with the support flange 31 facing the outlet 22 and the support flange 32 facing the inlet.

In this way, the air to be filtered which is in the first chamber 25 cannot enter axially into the tubular filter walls 30, which are closed by the support flange 32, and the air must therefore flow through the lateral passages 34.

As the lateral support flange 31 completely occupies the passage section of the filter box 2, the air to be filtered is forced to cross the tubular filter walls 30 radially from the outside towards the inside.

The filtered air thus flows axially along the tubular filter walls 30 and crosses the through-holes 33 of the support flange 31 and reaches the second chamber 26 and the outlet 22.

In this case too the tubular filter walls 30 are crossed in parallel by the air to be filtered.

In figures from 10 to 12 a further variant of the air filter 1 is illustrated, which differs from the preceding variant in terms of the characteristics reported in the following.

The filter cartridge 3 comprises two support flanges 31' and 32' which are both provided with respective through-holes 33.

The through-holes 33 of the support flange 31' are aligned with the internal cavities of a first group of tubular filter walls 30, the opposite ends of which are closed by the support flange 32'.

Similarly, the through-holes 33 of the support flange 32' are aligned with the internal cavities of a second distinct group of tubular filter walls 30, the opposite ends of which are closed by the support flange 31'.

The filter cartridge 3 is located internally of the filter box 2 with the support flange 31' facing toward the inlet 21 and the support flange 32' facing towards the outlet.

As illustrated in FIGS. 10 and 11, both the support flanges 31' and 32' are conformed such as to entirely occupy the transversal section of the filter box 2. In this way, they subdivide the internal volume of the filter box 2 into three distinct chambers, of which a first chamber 25 communicates with the inlet 21, a second chamber 26 communicates with the outlet 22 and an isolated intermediate chamber 27, containing the tubular filter walls 30.

Thanks to this solution, the air to be filtered which enters the first chamber 25 is forced to pass through the through-holes 33 of the support flange 31' and to flow axially along the tubular filter walls 30 of the first group.

As the opposite end is closed by the support flange 32', the air to be filtered is forced to cross the tubular filter walls 30 of the first group radially from the inside towards the outside in order to reach the intermediate chamber 27.

The tubular filter walls 30 of the first group are crossed in parallel by the air to be filtered.

Since the support flange 32' completely occupies the passage section of the filter box 2, the air reaching the intermediate chamber 27 cannot flow freely towards the outlet 22 and is thus forced to cross the filter walls 30 of the second group radially from the outside towards the inside.

In practice, the tubular filter walls 30 of the second group are crossed in parallel with regard to one another but in series with respect to the tubular filter walls 30 of the first group.

The filtered air finally flows axially along the tubular filter walls 30 of the second group and crosses the through-holes 33 of the support flange 32' in order to reach the second chamber 26 and the outlet 22.

The tubular filter walls 30 of the first group, which are crossed first by the air to be filtered, are destined to perform a prefiltering stage, while the tubular filter walls 30 of the second group, which are crossed second, are destined to perform a final filtration stage.

To this end, the tubular filter walls 30 of the first group can be of the same size as those of the second group, but generally are more porous.

The pre-filtering stage is useful for retaining the larger particles upstream and for preventing the tubular filter walls 30 intended for the final filtering from blocking too rapidly, thus increasing the working life of the filter cartridge 3.

The prefiltering stage can be obtained alternatively with a filter cartridge 3 as in the embodiment illustrated in FIGS. 13 and 14.

The filter cartridge 3 is the same as the one illustrated in FIG. 8, and differs therefrom in that it also comprises a filter membrane 35 conformed as a tubular sleeve which externally and coaxially envelops all the tubular filter walls 30 of the cartridge 3.

The filter membrane 35 has both ends open.

The ends of the filter membrane 35 are closed by the support flanges 31 and 32, such as to delimit an internal space in which the tubular filter walls 30 are contained.

The filter membrane 35 can be fixed to the support flanges 31 and 32 by gluing, using a joining attaching and detaching system, or any other appropriate system.

The filter membrane 35 can be made of a non-woven textile of polymer fibres, for example polypropylene or polyester, which can be obtained through any known process.

The filter membrane 35 is generally more porous than tubular filter walls 30. Thanks to this solution, the air to be filtered which enters the first chamber 25 is initially forced to cross the filter membrane 35 from the outside towards the inside.

Once inside the filter membrane 35, the air is thus forced to cross the tubular filter walls 30 radially, from the outside towards the inside.

The filtered air finally flows axially along the tubular filter walls 30 and crosses the through-holes 33 of the support flange 31 to reach the second chamber 26 and the outlet 22.

The tubular filter walls 30 are crossed in parallel with respect to one another, but in series with respect to the filter membrane 35, which is located upstream with respect to the air flow direction, to perform the pre-filtering stage.

In FIGS. 15 and 16 an air filter 1 is illustrated which differs from the previous ones in that the filter cartridge 3 comprises tubular filter walls 30', each of which is realised such as to exhibit an open end and a closed opposite end.

The closure is preferably obtained by crushing the lateral wall of each tubular filter wall 30' at the end thereof, such as to flatten it until two opposite portions of the lateral wall come into contact to close the passage.

The portions of the lateral wall in reciprocal contact are thus joined to one another, preferably by hot-welding, i.e. by at least partial fusion of the material of the wall, pressure and following solidification.

Alternatively, the portions in contact can be joined by gluing or by other known systems.

If possible, each filter wall 30' could be directly realised in the form of a recipient closed at the bottom thereof.

In this way, each tubular filter wall 30' substantially exhibits the shape of a hood or a narrow and long beaker.

The open ends of the tubular filter walls 30' are fixed to a single support flange 31 destined to connect them together, while the closed ends are left free.

The tubular filter walls 30' can be singly fixed to the support flange 31 by gluing, by means of an attaching and detaching system, or by any other appropriate system.

The support flange 31 can be made of a plastic or a metal.

The support flange 31 comprises a plurality of through-holes 33, in a same number as the tubular filter walls 30', each of which is aligned with the cavity of a respective tubular filter wall 30'.

As illustrated in FIGS. 15 and 16, the filter cartridge 3 is inserted in the filter box with the support flange 31 facing towards the inlet 21.

The support flange 31 is conformed such as to completely occupy the passage section of the filter box 2, sub-dividing the internal volume into the communicating chambers 25 and 26 communicating respectively with the inlet 21 and the outlet 22.

In this way, the air to be filtered entering the first chamber 25 is forced to pass through the openings 33 of the support flange 31 and to flow axially along the tubular filter walls 30'.

Since the opposite end of the tubular filter walls 30' is closed, the air to be filtered is forced to cross the tubular filters 30' radially from the inside towards the outside, to reach the second chamber 26, from where finally it flows freely towards the outside 22.

The tubular filter walls 30' are thus crossed in parallel by the air to be filtered. FIGS. 17 and 18 show an air filter 1 which differs from the preceding one due to the fact that the filter cartridge 3 is mounted substantially oppositely, i.e. with the support flange 31 facing towards the outlet 22.

In this case, as the support flange 31 completely occupies the passage section of the filter box 2, the air to be filtered which is in the chamber 25 is forced to cross the filter walls 30' radially from the outside towards the inside, and thereafter to flow axially along the tubular filter walls 30' in order to cross the openings 33 of the support flange 31 and reach the outlet 22.

In this case too the filter walls 30' are crossed in parallel by the air to be filtered. FIGS. 19 to 21 show an air filter 1 which differs from the preceding ones in that the filter cartridge 3 is also predisposed to perform an air prefiltering stage. The filter cartridge 3 comprises a further filter membrane 35', substantially conformed as a bag or a beaker, the mouth of which is closed by the support flange 31 such as to delimit an internal space in which all the tubular filter walls 30' are contained.

The filter membrane 35' can be fixed to the support flange 31 by gluing, with an attaching and detaching system or any other appropriate system.

The filter membrane 35' can be made in a non-woven textile made of polymer fibres, for example polypropylene or polyester, which can be obtained using any known process.

The filter membrane 35' is generally more porous than the tubular filter walls 30'.

The filter membrane 35' is effectively made as a tubular body destined to envelop the whole plurality of tubular filter walls 30', which tubular body exhibits an open end and a closed end which gives it the above-mentioned bag or beaker shape.

The closure is preferably obtained by crushing the lateral wall of the tubular filter membrane 35' at the ends thereof, such as to flatten it up to bringing the two opposite portions of the lateral wall into reciprocal contact, to close the passage.

The portions in contact are joined together, preferably by hot-welding, i.e. by at least partial fusion of the material of the wall, pressure and following solidification.

Alternatively, the portions in contact can be joined by gluing or by other known systems.

If possible the filter membrane 35' can be directly realised in the form of a recipient which is closed at a bottom thereof, such as a bag or a beaker.

As illustrated in FIGS. 19 and 20, the filter cartridge 3 is inserted in the filter box with the support flange 31 facing towards the outlet 22.

The support flange 31 completely occupies the passage section of the filter box 2, sub-dividing the internal volume into the chambers 25, 26 communicating respectively with the inlet 21 and the outlet 22.

In this way, the air to be filtered which reaches the first chamber 25 is forced to cross the filter membrane 35' from the outside towards the inside.

Once inside the filter membrane 35', the air is forced to cross the tubular filter walls 30', also from the outside towards the inside.

The filtered air finally flows axially along the tubular filter walls 30' and crosses the through-holes 33 of the support flange 31 in order to reach the outlet 22.

The tubular filter walls 30' are effectively crossed in parallel by the air to be filtered, but in series with respect to the direction of the air flow in order to be able to perform an effective pre-filtering of the air flow.

Obviously a technical expert in the sector might make numerous modifications of a technical-applicational nature to the above-described air filter 1, without forsaking the ambit of the invention as claimed herein below.

The invention claimed is:

1. An internal combustion engine filter, comprising an external casing (2) provided with at least an inlet (21) for a fluid to be filtered and an outlet (22) for the fluid when filtered, and a removable filter cartridge (3) located internally of the external casing (2), wherein the removable filter cartridge (3) comprises a support flange (31, 31', 32') and a plurality of tubular filter walls (30, 30') arranged parallel to one another which are destined to be crossed by the fluid flowing from the inlet (21) towards the outlet (22) of the external casing (2), wherein each tubular filter wall (30, 30') is made such as to exhibit at least an open end, wherein the open end of each tubular filter wall (30, 30') is fixed to the support flange (31, 31', 32') which is configured to connect the tubular filter walls (30, 30') to one another, and is provided with at least a through-hole (33) aligned with a cavity of the tubular filter wall (30, 30'), and wherein the external casing (2) further comprises an openable cover (23) of an opening through which the removable filter cartridge can be inserted or extracted, wherein the external casing (2) is conformed such as to delimit a pouch (24) a transversal section of which, performed along a perpendicular plane to axes of the tubular filter walls (30, 30'), exhibits a prevalent line of development (A) and a small width (B) with respect to the prevalent line of development (A), the tubular filter walls (30, 30') are arranged internally of the pouch (24), side by side with one another, forming a single row which follows the prevalent line of development (A) of the pouch (24), such that the width (B) of the pouch (24) is occupied by a single tubular filter wall (30), wherein the support flange (31, 31', 32') entirely occupies a transversal section of the external casing (2), such as to subdivide the internal volume thereof in two distinct chambers, of which a first chamber communicates with the inlet (21) and a second chamber communicates with the outlet (22).

2. The filter of claim 1, wherein the prevalent line of the development (A) is selected from a group constituted by: a curved line and a split line.

3. The filter of claim 1, wherein each tubular filter wall (30, 30') has a diameter which is not greater than 20% of a length thereof.

4. The filter of claim 1, wherein each tubular filter wall (30) is made such that an opposite end thereof is also open, the opposite end being closed by a second support flange (32, 31', 32') configured to connect the tubular filter walls (30) to one another.

5. The filter of claim 1, wherein each tubular filter wall (30') is made such that the opposite end is closed.

6. The filter of claim 5, wherein the closed end is obtained by flattening and joining the lateral wall of the tubular filter wall (30').

7. The filter of claim 1, wherein the removable filter cartridge (3) is predisposed such that the tubular filter walls (30, 30') are configured to be crossed in parallel by the fluid.

8. The filter of claim 1, the removable filter cartridge (3) is predisposed such that each tubular filter wall (30, 30') is configured to be crossed from the inside towards the outside.

9. The filter of claim 1, wherein the removable filter cartridge (3) is predisposed such that each tubular filter wall (30, 30') is configured to be crossed from outside towards an inside thereof.

10. The filter of claim 1, wherein the removable filter cartridge (3) comprises a further prefiltering tubular wall (35, 35') which externally envelops the plurality of tubular filtering walls (30, 30q), such as to be crossed by the fluid upstream of the tubular filter walls (30, 31').

11. The filter of claim 10, wherein the prefiltering tubular wall (35') is made such as to exhibit a closed end.

12. The filter of claim 11, wherein the closed end is obtained by flattening and joining an edge of the lateral wall of the prefiltering tubular wall (35').

13. The filter of claim 10 wherein the walls (30, 30', 35, 35') of the removable filter cartridge (3) are made of a non-woven textile of polymer fibres.

14. The filter of claim 13, wherein the removable filter cartridge (3) is realised using a melt-blown process.

15. The filter of claim 1, wherein the prevalent line of the development (A) is a straight line.

16. The filter of claim 1, wherein the external casing (2) has a longitudinal axis (X) parallel to the tubular filter walls (30, 30') and the opening for insertion or extraction of the removable filter cartridge (3) is in a lateral side of the external casing (2) with respect to the longitudinal axis (X).

17. The filter of claim 1, wherein the removable filter cartridge (3) comprises a first support flange (31') and a second support flange (32'), both conformed such as to entirely occupy the transversal section of the external casing (2), such as to subdivide the internal volume of the external casing (2) into three distinct chambers, of which a first chamber (25) communicates with the inlet (21), a second chamber (26) communicates with the outlet (22) and an isolated intermediate chamber (27), containing the tubular filter walls (30), and wherein at least a first one of the tubular filter walls (30) has its open end fixed to the first support flange (31'), which is provided with a through-hole (33) aligned with the cavity of this first filter wall (30), and wherein at least a second one of the tubular filter walls (30) has its open end fixed to the second support flange (32'), which is provided with a through-hole (33) aligned with the cavity of this second filter wall (30), such that the first tubular filter wall (30) is configured to be crossed by the fluid in series with respect to the second tubular filtering walls (30) of the removable filter cartridge (3), the first tubular filter wall (30) having a greater porosity than second tubular filter wall, and being located upstream of the latter with respect to the flow direction.

* * * * *